April 14, 1931. G. W. BATCHELL ET AL 1,800,203
LEER
Filed April 2, 1930  6 Sheets-Sheet 4

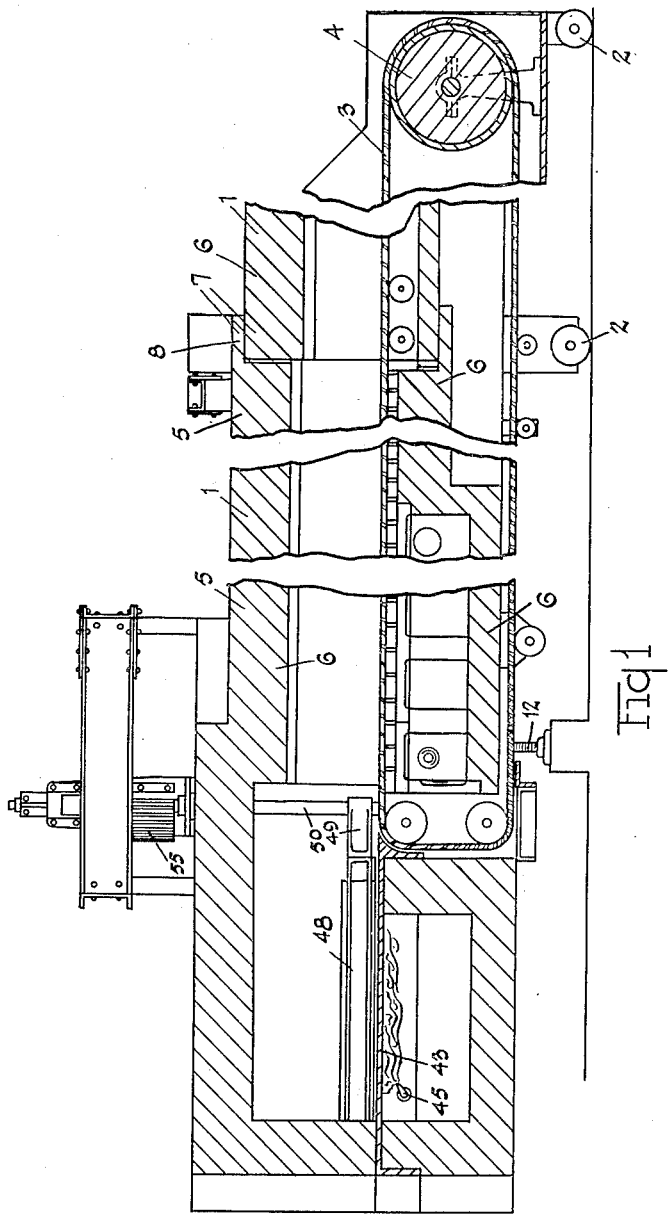

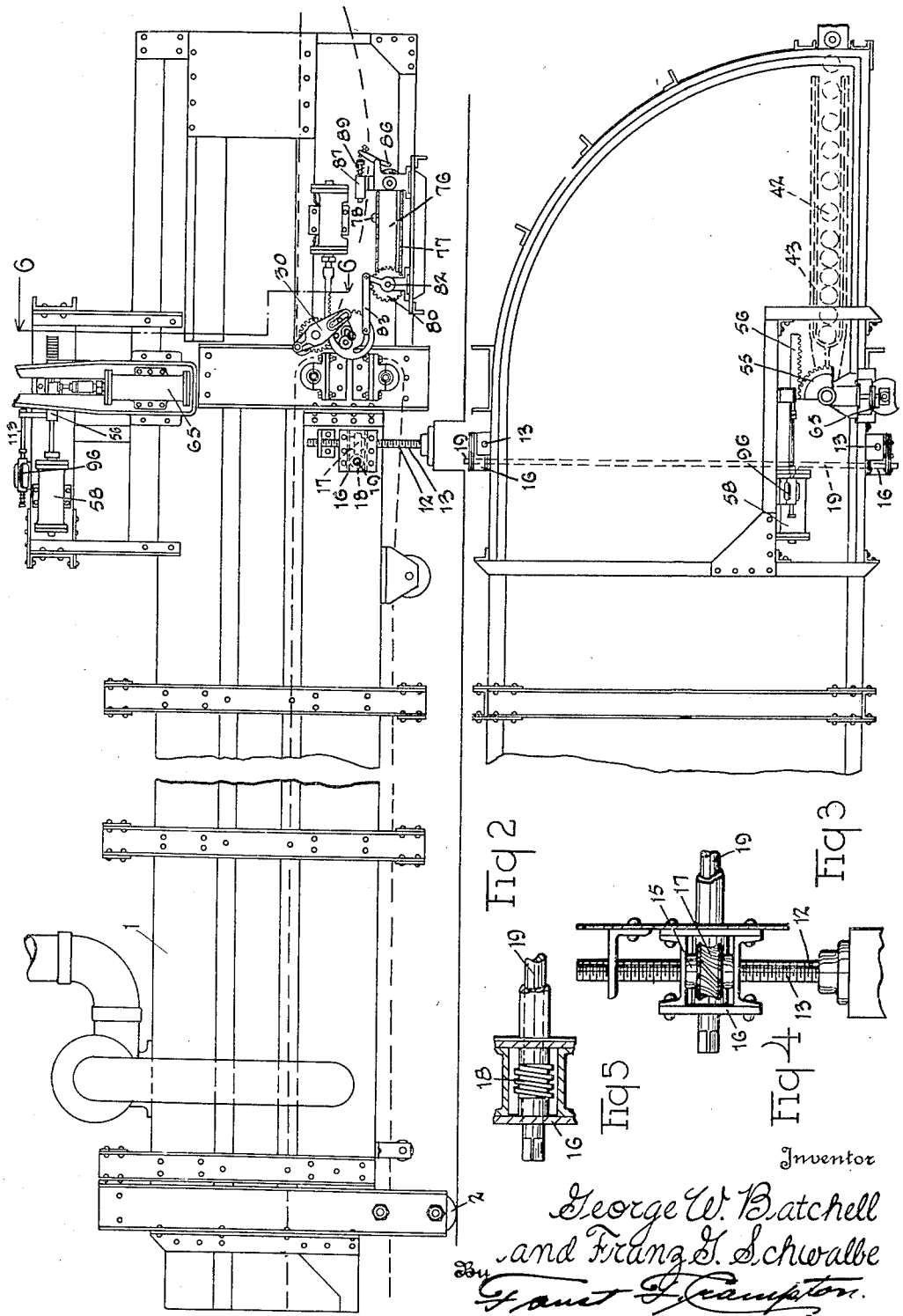

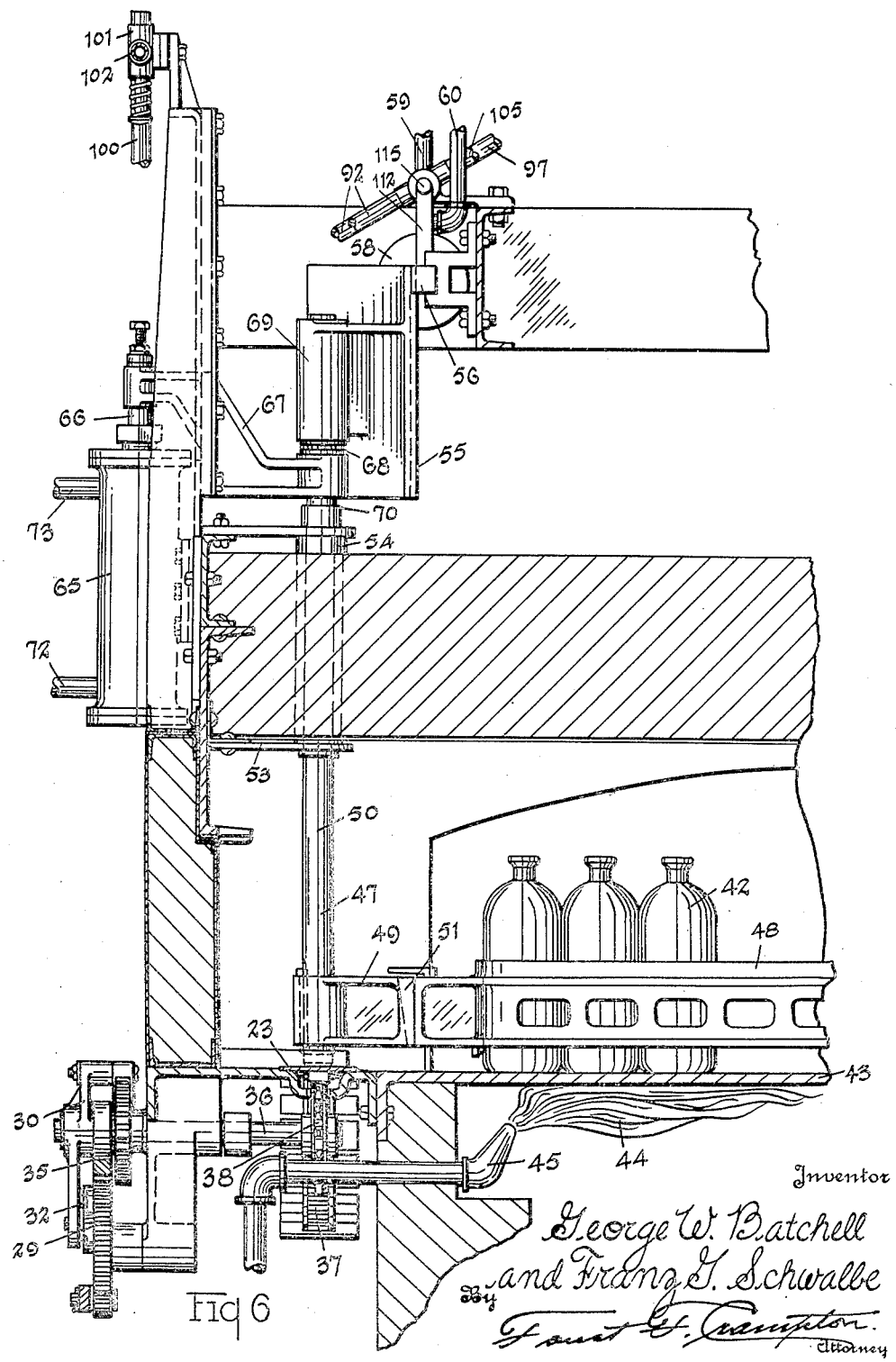

Inventor
George W. Batchell
and Franz G. Schawlbe
By Francis F. Crampton, Attorney April 14, 1931.      G. W. BATCHELL ET AL      1,800,203
LEER
Filed April 2, 1930      6 Sheets-Sheet 5

Inventor
George W. Batchell
and Franz G. Schwalbe
By Faust F. Crampton
Attorney

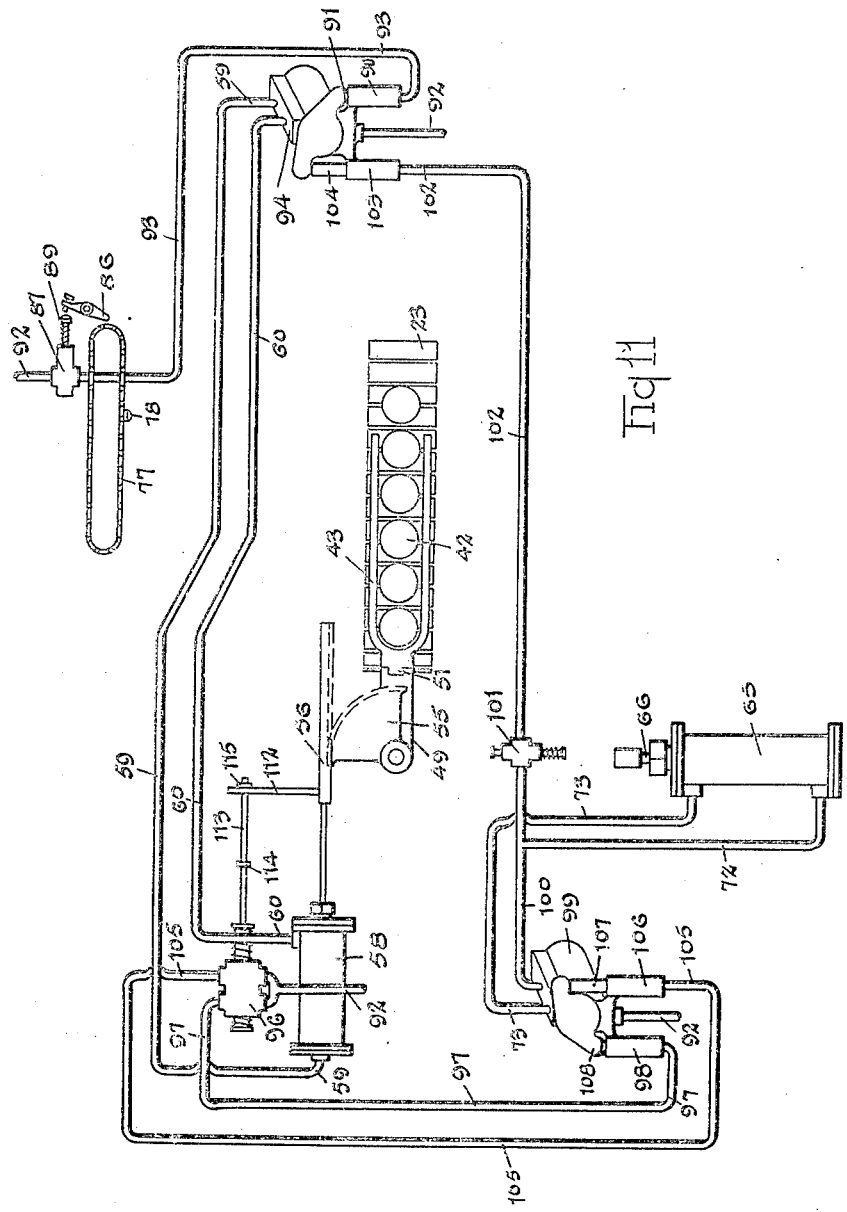

Patented Apr. 14, 1931

1,800,203

UNITED STATES PATENT OFFICE

GEORGE W. BATCHELL AND FRANZ G. SCHWALBE, OF TOLEDO, OHIO

LEER

Application filed April 2, 1930. Serial No. 440,913.

Our invention has for its object to provide an efficient leer, that is particularly adapted for the tempering or annealing of glass articles. The invention particularly provides a leer, that may be readily adjusted for the receipt of articles of different heights, producible by machines, operating substantially in fixed planes to deliver the articles from the machines, the tops of the articles being located at the same delivery point irrespective of the height of the articles, and which locates the bottoms of articles at different heights relative to a fixed plane. The part of the leer being adjustable, for receiving the glass articles according to the relative heights of the bottoms of the articles, enables the delivery to the leer without variation of the article forming machine.

The invention also provides, in combination with a conveyor which transfers the glass articles to the leer, a conveyor for slowly carrying the articles through the leer and an efficient means for transferring the articles from one conveyor to the other without sudden reduction of the temperature of the articles and without loss of time in meeting the continuous delivery of the receptacles from the bottle-making machine.

The invention also provides an exceedingly efficient air control mechanism for actuating parts of the mechanism, such as, the means for transferring the glass articles from one conveyor to the other conveyor as they are delivered, or, in accordance with the rate of their delivery from the machine to the leer.

The invention consists in other features and advantages which will appear from the following description and upon examination of the drawings. Structures containing the invention may partake of different forms and may be varied in their details and still embody the invention. To illustrate a practical application of the invention, we have selected a leer embodying the invention, as an example of the various structures and details thereof that contain the invention, and shall describe the selected structure hereinafter, it being understood that variations may be made without departing from the spirit of the invention. The particular structure selected is shown in the accompanying drawing.

Figure 7:
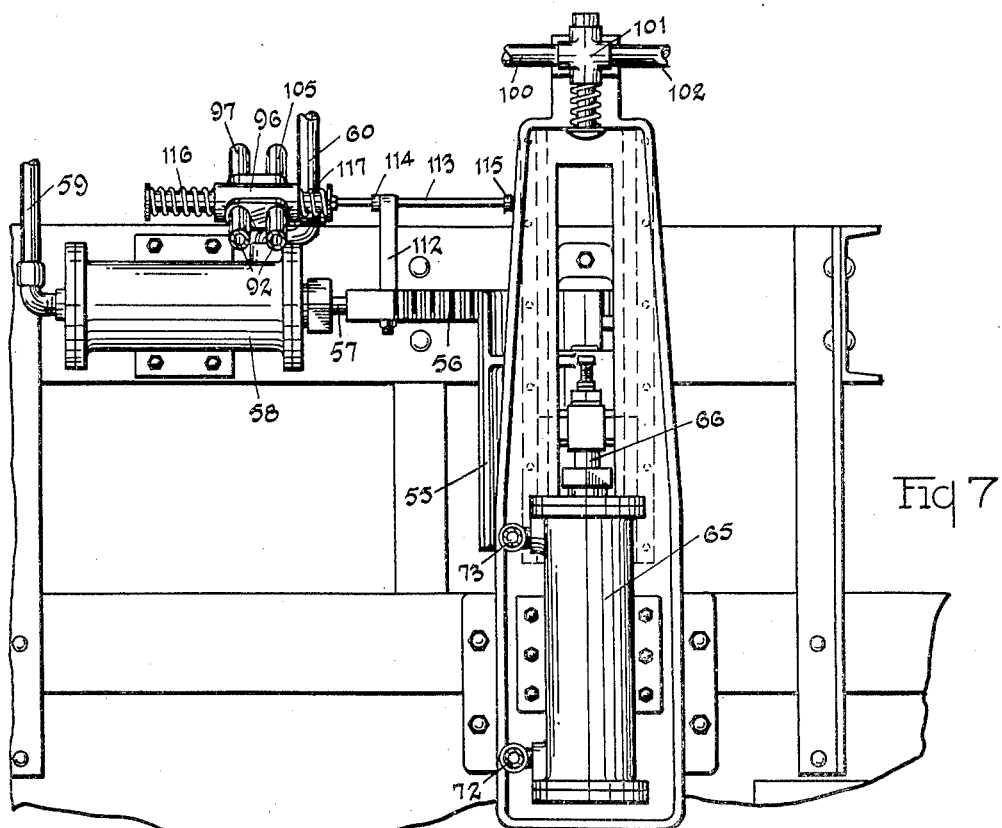
Figure 8:
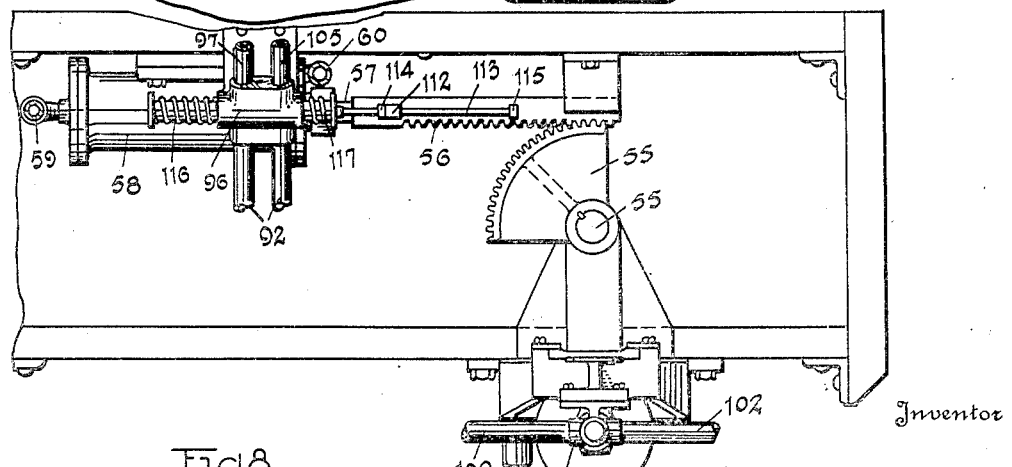
Figure 9:
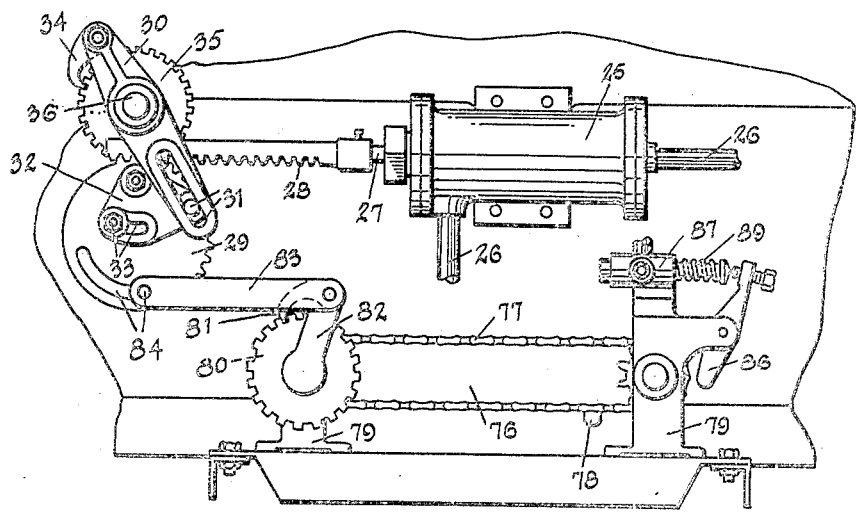
Figure 10:
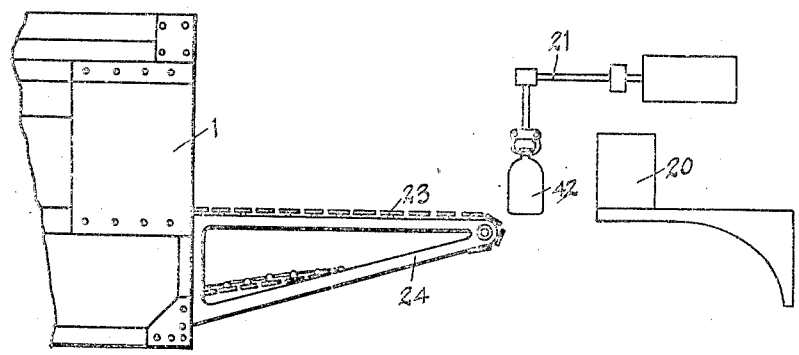

Fig. 1 illustrates a longitudinal section of the leer, parts being shown broken away in order that important parts of the leer may be illustrated in the figure. Fig. 2 is a side view of sections of the leer, a part of the leer being removed in order that a clearer illustration may be made of some of the details of the mechanism. Fig. 3 is a top view of the receiving end of the leer. Fig. 4 is a side view of a jack for adjusting the height of the receiving end of the leer. Fig. 5 is a view of a section of the lifting jack. Fig. 6 is a view of a section of the receiving end of the leer taken on the plane of the line 6—6 indicated in Fig. 2. Fig. 7 is a side view of a sweeper elevating mechanism. Fig. 8 is a top view of the sweeper mechanism. Fig. 9 illustrates a control mechanism for controlling the operation of the sweeper mechanism. Fig. 10 is a diagrammatic illustration showing the delivery of receptacles to the mechanism of the leer. Fig. 11 is a diagrammatic view of the air controlling devices which maintain the cycle of operations of the air actuated mechanism of the leer.

The leer 1 has the required lengths to continuously receive glass receptacles from one or more forming machines and to progressively and slowly convey the receptacles through the leer, and yet maintain the receptacles within the leer sufficiently long to permit annealing of the glass of which the receptacles are formed. Thus the temperature of the receptacles is raised or maintained as required and allowed to progressively change from the time that the articles are received to the time that they are delivered, whereby the glass of which they are composed will be efficiently annealed and all strained portions thereof will be entirely removed.

The leer 1 is, preferably, mounted on rollers, such as the rollers 2, in order that the leer may be moved away from the machines at the completion of a run, or any number of runs. The leer is provided with the usual wire belt 3 that is driven by means of a suitable roller 4, in the manner well known in the art, for conveying the receptacles or articles from one end of the leer to the other end. Also, the leer is provided with a section 5 that is movable relative to the body of the leer for adjusting the receiving end of the leer. Any suitable means may be provided for forming a joint at the point of connection between the forward section 5 of the leer and the body of the leer. The leer is formed of thick heat insulated walls, such as the wall 6, and overlapping portions cover and enclose the space between the section 5 and the adjoining end of the body portion of the leer, such as, the overlapping portions 7, which prevent the escape of the heat. The walls 6 of the leer are formed of clay blocks or other refractory material, which retains the heat used in annealing, or tempering, the glass articles, and rows of loose brick may be located over contiguous portions of the section 5 and the end of the main or body portion of the leer 1, such as, at 8, whereby a flexible and substantially sealed joint is made at this point.

In many forms of machines used in making glass articles, particularly bottles, the delivery of the receptacles from the machines is done so that the upper ends of the articles will be located, upon delivery, substantially in a fixed plane and, consequently, the bottoms of the articles will vary in their relative positions according to the height of the articles. Inasmuch as the articles are delivered from the machine to the leer by a conveyor on which the articles rest, it is important to adjust the leer according to the height of the bottoms of the articles. The leer being preferably provided with an adjustable section located at its receiving end, it may be varied in height according to the height of the articles that may be delivered from the machine. Parts of the leer, or of the mechanism of the leer, may be similarly varied in order to receive the articles to be delivered to the leer. In the particular form of construction shown, the forward movable section of the leer is raised, which also adjusts the receiving mechanism of the leer.

The leer is provided with a pair of lifting jacks 12, having vertical threaded standards 13 and rotatable nuts 15, that are connected to the framework of the section 5 of the leer by means of the brackets 16. The nuts 15 may be formed within the hub of spiral gears 17, located between the brackets 16, and the spiral gears 17 may be interconnected by means of a rod 19. The spiral gears are operated by worm gears 18 formed on the rod 19 so that the worm gears mesh with the spiral gears or worm wheels 17. Rotation, as by a suitable crank, will cause rotation of the spiral gears 17 and vary the height of the section 5 of the leer, as the rotation of the worm gears 18 raise or lower the spiral gears along the standards 13. This adjusts the height of the receiving end of the conveyor, or, of the part of the leer to which the articles are delivered from the article forming machine.

The receiving end of the leer is provided with a small conveyor 23 that may be supported in any suitable manner on the end of the leer, such as by means of the bracket 24 which protrudes from the forward end of the conveyor, to receive the articles from the article forming machine. Consequently, the adjustment that is made locates the receiving end of the conveyor 23 according to the height of the article. The articles are placed, in succession, on the conveyor 23 by the forming machine, as they are produced, and the conveyor 23 conveys the articles into the receiving end of the leer.

The conveyor 23 may be driven by any suitable means. Inasmuch as air is commonly used for transmission of power in glass factories, the conveyor 23 may be readily moved by a pneumatically operated device, such as the cylinder 25, to which air is conducted and exhausted, alternately, through the pipes 26. The movement of the air, within the pipes 26, may be controlled by suitable valves located at a point remote from the cylinder 25 to cause reciprocatory movements of the piston rod 27, in the manner well known in the art. A rack 28 may be connected to the piston rod 27 to produce oscillatory movements of the gear wheel 29 and corresponding oscillatory movements of the lever 30, which is connected to the gear wheel 29 by a slot and pin connection 31. The extent of the angular movement of the lever 30 is determined by the location of the pin and slot connection 31 relative to the axis of rotation of the gear wheel 29. The pin 31 is preferably adjustably secured to the gear wheel 29 by means of a segment 32 that may be suitably bolted to the gear wheel 29 and adjusted, by means of a slot and bolt connection 33, to vary length of the arc that is described by the pin that connects the gear wheel 29 with the lever 30. The lever 30 is provided with a dog 34, which operates on a ratchet wheel 35, when the dog is moved in one direction, the lever 30 being automatically disconnected from the ratchet wheel 35 on the return movement of the lever 30. The ratchet 35 is connected to a shaft 36, which drives the conveyor 23. The conveyor 23 is provided with a plurality of plates, that are connected to a sprocket chain 37, and the shaft 36 has a sprocket wheel 38 that operates on the sprocket chain 37 to move the conveyor 23, step by step, as the air is directed to, and exhausted from, the cylinder 25, through the pipes 26. The air is controlled preferably by air valves that are actuated by the article forming machine, so that the conveyor will be moved one step each time that the article is placed on the conveyor, and in advance of the placement of the succeeding article. Thus, the rotation of the shaft 36 and the movement of the conveyor 23 may be varied by means of the adjustable connecting plate 32, according to the dimensions of the article that is being formed by the glass forming machine, to give ample room for the receipt of succeeding articles on the conveyor.

The articles, such as the bottles 42, are conveyed to a point within the end of the leer, by the conveyor 23, and are then shifted over a heated plate, located in the plane of the top of the conveyor, onto the main leer conveyor. The plate 43 is, preferably, made in the form of a quadrant and provides a comparatively smooth surface for sliding the receptacles from the conveyor 23 onto the main conveyor 3. The plate 43 is heated by any suitable form of heater, such as by a gas flame 44 that distributes its heat over the under surface of the plate 43 from the burner 45. The heat from the heater prevents the plate 43 from chilling the bottom of the receptacles, or articles, as they are shifted from one conveyor to the other.

The receptacles 42 are shifted to the main conveyor of the leer by means of a sweeper 47 and the mechanism that is used for operating the sweeper. The sweeper may partake of different forms according to the articles that are to be annealed in the leer. In the particular form of construction shown, the sweeper 47 comprises a forked member 48 having side walls that are spaced apart substantially the diameter of the receptacles 42 and which are connected together and supported by an arm 49 that is rotatably moved and shifted by means of a rod 50, according to the operations of the sweeper mechanism. Assuming the initial position of the sweeper member is such that it will receive between its side walls 48, the receptacles that are conveyed by the conveyor 23, that is, in such position that the receptacles 42 will be carried by the conveyor 23 between the side walls 48 until they are brought to near the end wall of the fork. The conveyor 23 continues to deliver the receptacles until the fork is substantially loaded, whereupon the fork will be swung 90 degrees to shift the receptacles 42 over the plate 43 onto the main conveyor 3 of the leer. The length of the walls 48 is a little less than the width of the conveyor 3 which will place the bottles in rows extending transversely on the plate 3. As each row of receptacles are placed in position on the conveyor 3, the fork member is lifted and swung in the reverse direction to a point above the conveyor 23 and then lowered to receive sufficient number of bottles to make the succeeding row. The swinging movements of the sweeper 47 is accomplished in a very short time and in advance of the time that the first of the succeeding row of bottles or receptacles will reach the portion of the sweeper that joins the side walls 48 of the fork. When the fork has been again filled, it will again perform the operations described to place a succeeding row of bottles on the conveyor 3.

This cycle of operations of the fork member 47 is accomplished by pneumatic control of the mechanism that operates the sweeper. The rod 50 extends through the sleeve 54 supported by suitable brackets 53 on the frame of the leer. It is provided with a sector plate 55 having parallel teeth of considerable length. The sector plate 55 is cylindrical in form and its teeth or ridges form a means whereby the sweeper may be swung at two different levels by a gear that meshes with the sector plate, and also to enable maintenance of the interconnection of the gear. The rod 50 is angularly moved by the rack 56 that meshes with the sector plate 55. The rack 56 is connected to the piston rod 57 that is pneumatically operated by the cylinder 58 into which air is introduced and exhausted through the pipes 59 and 60 as may be determined by controlling valves which are in turn controlled first, by the loading of the fork 48, and, second, by the delivery of the receptacles within the fork 48 onto the main conveyor 3. The rod 50 is raised and lowered by means of the cylinder 65 operating upon the piston rod 66 to which is connected the arm 67 through which the rod 50 extends. The end of the arm 67 is provided with a suitable bearing sleeve 68 that is located intermediate the hub 69 of the sector plate 55 and the sleeve 70 located on the rod 50. When, therefore, the piston rod 66 is raised, it operates to raise the rod 50 and the forked member 49 high enough to clear the receptacles 42 on the return movement which is produced by the sector 56 and the reversal of the air pressures in the cylinder 58. This returns the forked member 49 to a point above the conveyor 23 whereupon the reversal of the air pressures in the cylinder 65 lowers the sweeper 47 in position to receive the receptacles 42 between the walls 48. The cylinder 65 is pneuamtically operated by air introduced under pressure or exhausted through the pipes 72 and 73. The connections with the pipes 72 and 73 are controlled by air valves that are operated at the proper times in the sequence of the movements of the sweeper 47.

The air valves, that control the cylinders 58 and 65, are actuated by movements induced by these cylinders and the operation of the sweeper is initiated by a load regulator which operates when the sweeper has received the desired number of articles, preferably, when it has received a sufficient number of articles to make a complete row extending across the conveyor 3.

A load regulator is, preferably, operated in accordance to the movement of the conveyor belt 23 which has a step by step movement that is performed as the articles are placed upon the conveyor 23. In the preferred form of structure, a load regulator 76 comprises a sprocket chain 77, having knobs 78 connected to the sprocket chain 77, that is moved over sprocket wheels supported on suitable brackets 79 located on the frame work of the leer. The sprocket chain 77 may be operated by means of a ratchet wheel 80 that is engaged by a dog 81 which is supported in position by means of an arm 82 and a link 83. The link 83 is adjustably connected by means of the pin and slot connection 84 to the gear wheel 29. Or, if desired, the pin 84 may be slidably movable within the slot 84 so as to cause shorter movements of the dog 81 in causing a step by step movement of the sprocket chain 77. The dog 81 being operated, in that case, only at the completion of the oscillatory strokes of the lever 30. Thus the movement of the ratchet wheel 80 may be very much less than the movements of the ratchet wheel 35. Any number of knobs 78 may be located on the chain 77 according to the load capacity of the forked member 48. They protrude from the chain 77 so as to engage the end of the lever 86 as they pass around one of the sprocket wheels on which the chain moves. The lever 86 operates a valve 87 to connect the cylinder 58 with a source of supply of air under pressure which will be directed into the cylinder 58 to produce a sweeping movement of the sweeper 47 to slide the receptacles from the conveyor 23 over the heated plate 43 and onto the conveyor 3.

In Figure 11 is shown, diagrammatically, the connections with a source of supply of air under pressure which is indicated merely by the pipes that are shown broken to reduce indicated crossings of pipes, it being understood that the broken ends of the pipes interconnect and connect with an air pump, or a reservoir, into which air is pumped. The valve 87 is a slide valve which is spring pressed by the spring 89 that causes its return when the knob 78 is moved from beneath the lever 86. The air under pressure passes through a cylinder 90 which operates a piston 91, the air being conducted, from the source of supply, indicated by 92, through the pipe 93 to the cylinder 90. The piston 91 operates a rocker valve 94 to connect the source of supply, indicated by 92, to the cylinder 58 through the pipe 60 which operates the sector plate 55 to swing the sweeper 47 and move the receptacles from the conveyor 23 onto the conveyor 3. This arcuate movement is performed until the valve 96 is operated to connect the source of supply of air, indicated by 92, through the pipe 97 to the cylinder 98 that operates a rocker valve 99 to connect the air from the source of supply, indicated at 92, through the pipe 100 and the pipe 72 to the cylinder 65. The pressure of the air in the cylinder 65 raises the sweeper 47 from the receptacles 42 until they have been placed in position on the conveyor 3. Upon the completion of the upward stroke, the piston rod 66 operates the spring pressed valve 101 to open the connection of the pipe 100 through the pipe 102 to the cylinder 103. This operates the piston 104 of the rocker valve 94 to connect the source of supply, indicated by 92, through the pipe 59 to the cylinder 58 which immediately moves the sweeper to a position above the conveyor 23. The valve 96 is operated by the rack 56 which connects the source of supply, indicated by 92, through the pipe 105 to the cylinder 106, which operates the piston 107, that, in turn, operates the rocker valve 99 and directs the air from the source, indicated at 92, through the pipe 73 to the cylinder 65, which lowers the piston 66 and the sweeper 47 to the conveyor 23. Thus the air control mechanism is restored to its normal position and its operations will again be induced when the knob 78 engages the lever 86 to operate the valve 87.

The valves 94 and 99 have suitable outlets for exhausting the cylinders, that they control, when each rocker valve is operated to connect its associated cylinder with the source of supply, in the manner well known in the art. The valves 87, 96, and 101 are spring pressed slide valves and operated when they are released by their actuating members, namely, the lever 86, the rack 56, and the piston rod 66, respectively. The rack 56 is provided with an arm 112. A rod 113 extends through one end of the arm 112 and is provided with stops 114 and 115. The valve 96, being a spring pressed valve, is operated by the springs 116 and 117 to maintain the movable valve member in a substantially central or neutral position, except as the arm 112 engages one or the other of the stops 114 and 115. Consequently when the arm 112 is released from one or the other of the stops, the valve assumes the neutral position and is moved therefrom when the arm 112 engages the other of the stops. The valves 87 and 101 are similar in their construction. They are spring pressed to maintain the valves in closed positions except as they are operated by the lever 86 in one case, and the piston rod 66 in the other case.

While in accordance with the provisions of the statutes, we have illustrated and described the best forms of the invention now known to us, those skilled in the art will readily understand that many changes may be made in the form of the device disclosed without departing from the spirit of the invention, as set forth in the appended claims, and that certain features of the invention may be used to advantage without a corresponding use of other features.

We claim:
1. In a leer, a means for conveying articles to the leer, a main leer conveyor, a sweeper, means for swinging the sweeper to convey the articles from the means to the conveyor and return the sweeper to the means, and a means for raising and lowering the sweeper to disengage the articles and to receive the articles.

2. In a leer, a sweeper, a pneumatic means for operating the sweeper to convey the articles received by the leer to the main conveyor belt of the leer, a valve for controlling the said pneumatic means, means for operating the valve as the articles are received by the leer, a pneumatic means for raising the sweeper, a valve for controlling the last named pneumatic means and operated by the first named pneumatic means for removing the sweeper from the articles.

3. In a leer, a conveyor for conveying articles through the leer, a sweeper, a pneumatic means for operating the sweeper to move the articles onto the conveyor, a valve for controlling the pneumatic means and operated according to the number of articles received by the leer, a pneumatic means for raising and lowering the sweeper, a valve operated by the first named pneumatic means for raising the sweeper, a third valve for operating to control the first named pneumatic means to cause the return of the sweeper, the third valve operated by the second named pneumatic means, the second valve operated by the first named pneumatic means for causing the operation of the second named pneumatic means to lower the sweeper.

4. In a leer, the leer formed of two sections, one of the sections angularly movable with reference to the other of the sections, a conveyor extending substantially throughout the length of the leer for conveying articles through the leer, a bracket secured to the outer end of the movable section, a second conveyor supported on the bracket substantially in the plane of the first named conveyor for delivering articles to the first named conveyor, means for moving the articles from the second named conveyor to the first named conveyor and means for adjusting the movable section and the bracket according to the highth of the articles conveyed to the leer while maintaining the portion of the conveyor within the movable section and the second named conveyor movable over the bracket in the same plane.

5. In a leer, a conveyor located in the leer, a sweeper, means for delivering the article to the sweeper, means for operating the sweeper to move the articles from the delivering means to the conveyor and an adjustable step-by-step mechanism and means for operating the step-by-step mechanism as the articles are delivered to the sweeper, the step-by-step mechanism having a means for initiating the movement of the said last named means when a predetermined number of articles are delivered to the sweeper.

In witness whereof we have hereunto signed our names to this specification.

GEORGE W. BATCHELL.
FRANZ G. SCHWALBE.